United States Patent
Allen et al.

(10) Patent No.: US 9,732,442 B2
(45) Date of Patent: *Aug. 15, 2017

(54) PROCESS FOR PREPARING ARAMID COPOLYMER YARN HAVING LOW RESIDUAL SULFUR

(75) Inventors: Steven R. Allen, Midlothian, VA (US); Vlodek Gabara, Richmond, VA (US); Joseph Lenning Lowery, Midlothian, VA (US); Steven Raymond Lustig, Landenberg, PA (US); Christopher William Newton, Richmond, VA (US); David J. Rodini, Midlothian, VA (US); Andrew J. Sitter, Mechanicsville, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 212 days.

This patent is subject to a terminal disclaimer.

(21) Appl. No.: 14/371,746

(22) PCT Filed: Jan. 11, 2012

(86) PCT No.: PCT/US2012/020948
§ 371 (c)(1),
(2), (4) Date: Jul. 11, 2014

(87) PCT Pub. No.: WO2013/105954
PCT Pub. Date: Jul. 18, 2013

(65) Prior Publication Data
US 2014/0353858 A1 Dec. 4, 2014

(51) Int. Cl.
*D01D 10/06* (2006.01)
*D01F 11/06* (2006.01)
(Continued)

(52) U.S. Cl.
CPC ........... *D01D 5/06* (2013.01); *B29D 99/0078* (2013.01); *D01F 6/805* (2013.01); *D01F 11/08* (2013.01)

(58) Field of Classification Search
CPC .. D01D 5/06; D01D 10/06; D01F 6/78; D01F 6/80; D01F 6/805; D01F 11/06; D01F 11/08; D06B 3/04
(Continued)

(56) References Cited

U.S. PATENT DOCUMENTS 3,886,251 A * 5/1975 Sekiguchi ............... D01D 5/06
264/184
4,172,938 A 10/1979 Mera
(Continued)

FOREIGN PATENT DOCUMENTS

CN 101165078 4/2008
CN 101787582 7/2010
(Continued)

OTHER PUBLICATIONS

PCT International Search Report and Written opinion for International Application No. PCT/US2012/020902 Dated Sep. 27, 2012.
(Continued)

*Primary Examiner* — Leo B Tentoni (57) ABSTRACT

The present invention concerns methods for producing a yarn comprising the steps of: (a) producing a plurality of dope filaments by spinning a polymer solution in sulfuric acid through a multi-hole spinneret, the polymer comprising imidazole groups; (b) coagulating the plurality of dope filaments into an as-spun yarn; (c) contacting the yarn with an aqueous base having a pKa less than or equal to 11; and (d) rinsing the yarn.

16 Claims, 4 Drawing Sheets

(51) Int. Cl.
*D01D 5/06* (2006.01)
*D01F 6/80* (2006.01)
*D01F 11/08* (2006.01)
*B29D 99/00* (2010.01)

(58) Field of Classification Search
USPC ............ 264/178 F, 178 R, 183, 184, 211.14, 264/211.15, 211.16, 232, 233; 8/115.51, 8/115.54, 137.5
See application file for complete search history.

(56) References Cited

U.S. PATENT DOCUMENTS

| | | | |
|---|---|---|---|
| 5,233,004 A | | 8/1993 | Dembek et al. |
| 5,571,891 A | | 11/1996 | Jung et al. |
| 2003/0064316 A1 | | 4/2003 | Zebala |
| 2004/0119187 A1* | | 6/2004 | Mattes .................. D01D 5/06 264/184 X |
| 2007/0083032 A1* | | 4/2007 | Bos ....................... C08G 69/26 528/310 |
| 2010/0001433 A1* | | 1/2010 | Boerstoel ................ D01F 6/805 264/291 |
| 2010/0029159 A1 | | 2/2010 | Ishihara | 
| 2011/0046340 A1 | | 2/2011 | Devos et al. |

FOREIGN PATENT DOCUMENTS

| | | |
|---|---|---|
| RU | 2285760 | 10/2006 |
| WO | WO2005/054337 | 6/2005 |
| WO | WO2008105547 | 9/2008 |

OTHER PUBLICATIONS

PCT International Search Report and Written opinion for International Application No. PCT/US2012/020908 Dated Sep. 27, 2012.
PCT International Search Report and Written opinion for International Application No. PCT/US2012/020912 Dated Oct. 29, 2012.
PCT International Search Report and Written opinion for International Application No. PCT/US2012/020853 Dated Sep. 25, 2012.
PCT International Search Report and Written opinion for International Application No. PCT/US2012/020856 Dated Oct. 8, 2012.
PCT International Search Report and Written opinion for International Application No. PCT/US2012/020854 Dated Oct. 8, 2012.
PCT International Search Report and Written opinion for International Application No. PCT/US2012/020857 Dated Oct. 1, 2012.
PCT International Search Report and Written opinion for International Application No. PCT/US2012/020940 Dated Sep. 26, 2012.
PCT International Search Report and Written opinion for International Application No. PCT/US2012/020948 Dated Sep. 19, 2012.
PCT International Search Report and Written opinion for International Application No. PCT/US2012/020951 Dated Sep. 26, 2012.
V.N. Sugak, V.N. Kiya-Oglu, and I.L. Goloburdina, Fabrication of Fibres from Sulfuric Acid, Fibre Chemistry, vol. 31, No. 1 1999.
PCT International Search Report and Written opinion for International Application No. PCT/US2012/020883 Dated Sep. 28, 2012.
PCT International Search Report and Written opinion for International Application No. PCT/US2012/020887 Dated Sep. 26, 2012.

* cited by examiner

FIG. 4

PROCESS FOR PREPARING ARAMID COPOLYMER YARN HAVING LOW RESIDUAL SULFUR

TECHNICAL FIELD

The present application concerns processes for preparing an aramid copolymer yarn having low residual sulfur.

BACKGROUND

Advances in polymer chemistry and technology over the last few decades have enabled the development of high-performance polymeric fibers. For example, liquid-crystalline polymer solutions of rigid-rod polymers can be formed into high strength fibers by spinning liquid-crystalline polymer solutions into dope filaments, removing solvent from the dope filaments, washing and drying the fibers; and if desired, further heat treating the dried fibers to increase tensile properties. One example of high-performance polymeric fibers is para-aramid fiber such as poly(paraphenylene terephthalamide) ("PPD-T" or "PPTA").

Fibers derived from 5(6)-amino-2-(p-aminophenyl)benzimidazole (DAPBI), para-phenylenediamine (PPD) and terephthaloyl dichloride (TCl) are known in the art. Hydrochloric acid is produced as a by-product of the polymerization reaction. The majority of the fibers made from such copolymers have generally been spun directly from the polymerization solution without further treatment. Such copolymers are the basis for high strength fibers manufactured in Russia, for example, under the trade names Armos® and Rusar®. See, Russian Patent Application No. 2,045,586. However, the copolymer can be isolated from the polymerization solvent and then redissolved in another solvent, typically sulfuric acid, to spin fibers, as provided for example, in Sugak et al., *Fibre Chemistry* Vol 31, No 1, 1999; U.S. Pat. No. 4,018,735; and WO 2008/061668.

Known processes for making copolymer fibers directly from polymerization solution, while producing a good product for use in ballistic and other aramid end-uses, are very expensive with very poor investment economics. As such, there is a need in the art for manufacturing processes wherein the copolymer is solutioned in a common solvent, such as sulfuric acid which has improved economics compared to processes known in the art.

Previously, it has been assumed that fibers derived from copolymers of 5(6)-amino-2-(p-aminophenyl)benzimidazole, para-phenylenediamine and terephthaloyl dichloride and solutioned from sulfuric acid could be spun into to high quality fibers using processing similar to that used for making PPD-T fibers, since the compositions appear similar. However, it has been found that spinning the copolymer into high tenacity fibers has unique challenges that are not present in the PPD-T framework and new techniques are needed. Since higher tenacity fibers can provide more utility due to their strength per unit weight, improvement in tenacity is welcomed.

SUMMARY

In some embodiments, the invention concerns process for producing a yarn comprising the steps of: (a) producing a plurality of dope filaments by spinning a polymer solution in sulfuric acid through a multi-hole spinneret, said polymer comprising imidazole groups; (b) coagulating the plurality of dope filaments into an as-spun yarn; and (c) contacting the yarn with an aqueous base having a pKa less than or equal to 11 and (d) rinsing the yarn. In some processes, the aqueous base comprises ammonium hydroxide, sodium bicarbonate, sodium carbonate, or mixtures thereof.

In certain embodiments, the polymer comprises residues of 5(6)-amino-2-(p-aminophenyl)benzimidazole, aromatic diamine, and aromatic diacid-chloride. In certain embodiments, the aromatic diacid-chloride is terephthaloyl dichloride. In certain embodiments, the aromatic diamine is para-phenylenediamine. For some preferred polymers, a stoichiometric amount of terephthaloyl dichloride relative to the sum of the amount of 5(6)-amino-2-(p-aminophenyl)benzimidazole and aromatic diamine is utilized in forming the polymer. In some embodiments, the molar ratio of 5(6)-amino-2-(p-aminophenyl)benzimidazole to aromatic diamine is in the range of from 30/70 to 85/15. In certain embodiments, the molar ratio of 5(6)-amino-2-(p-aminophenyl)benzimidazole to aromatic diamine is in the range of from 45/55 to 85/15.

Some yarns of the invention have a sulfur content of 1 or less, 0.8 or less, or 0.5 or less, 0.01 to 3.0 or 0.05 to 2.5 or 0.1 to 1.75, or 0.1 to 1.0 or 0.01 to 0.08 or 0.01 to 0.05 weight percent based on the weight of the fiber.

In certain embodiments, in step d) the yarn is rinsed with additional quantities of aqueous base. In some processes, in step d) the yarn is rinsed with an aqueous solution. In some embodiments, in step d) the yarn is rinsed with water.

Some embodiments of the invention further comprise the step heating the yarn to a temperature of at least 350° C.

In some aspects, the invention concerns yarns comprising fibers of the invention. Some yarns have a tenacity of 32 cN/dtex (35.6 gpd) or higher or 34 cN/dtex (37.8 gpd) or higher or 36 cN/dtex (40 gpd) or higher.

BRIEF DESCRIPTION OF THE DRAWINGS

The foregoing summary, as well as the following detailed description, is further understood when read in conjunction with the appended drawings. For the purpose of illustrating the invention, there is shown in the drawings exemplary embodiments of the invention; however, the invention is not limited to the specific methods, compositions, and devices disclosed. In the drawings.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In some embodiments, the polymer comprises residues of 5(6)-amino-2-(p-aminophenyl)benzimidazole, aromatic diamine, and aromatic diacid-chloride. Suitable aromatic diacid chlorides include terephthaloyl chloride, 4,4'-benzoyl chloride, 2-chloroterephthaloyl chloride, 2,5-dichloroterephthaloyl chloride, 2-methylterephthaloyl chloride, 2,6-naphthalenedicarboxylic acid chloride, and 1,5-naphthalenedicarboxylic acid chloride. Suitable aromatic diamines include para-phenylenediamine, 4,4'-diaminobiphenyl, 2-methyl-paraphenylenediamine, 2-chloro-paraphenylenediamine, 2,6-naphthalenediamine, 1,5-naphthalenediamine, and 4,4'-diaminobenzanilide.

In some embodiments, the present invention is related to a process that produces fiber derived from the polymerization of 5(6)-amino-2-(p-aminophenyl)benzimidazole, para-phenylenediamine, and terephthaloyl dichloride at high solids (7 weight percent or greater) in NMP/$CaCl_2$ or DMAC/$CaCl_2$, isolates the copolymer crumb, dissolves the isolated copolymer crumb in concentrated sulfuric acid to form a liquid crystalline solution, and spins the solution into fibers.

The copolymerization reaction of 5(6)-amino-2-(p-aminophenyl)benzimidazole, para-phenylenediamine, and terephthaloyl dichloride can be accomplished by means known in the art. See, for example, PCT Patent Application No. 2005/054337 and U.S. Patent Application No. 2010/0029159. Typically, one or more acid chloride(s) and one or more aromatic diamine(s) are reacted in an amide polar solvent such as N,N-dimethylformamide, N,N-dimethylacetamide, N-methyl-2-pyrrolidone, dimethylimidazolidinone and the like. N-methyl-2-pyrrolidone is preferred in some embodiments.

In some embodiments, before or during the polymerization, a solubility agent of an inorganic salt such as lithium chloride, or calcium chloride, or the like is added in a suitable amount to enhance the solubility of the resulting copolyamide in the amide polar solvent. Typically, 3 to 10% by weight relative to the amide polar solvent is added. After the desired degree of polymerization has been attained, the copolymer is present in the form of an un-neutralized crumb. By "crumb" it is meant the copolymer is in the form of a friable material or gel that easily separates into identifiable separate masses when sheared. The un-neutralized crumb includes the copolymer, the polymerization solvent, the solubility agent and the byproduct acid from the condensation reaction, typically hydrochloric acid (HCl).

After completing the polymerization reaction, the un-neutralized crumb can optionally be contacted with a base, which can be a basic inorganic compound, such as sodium hydroxide, potassium hydroxide, calcium hydroxide, calcium oxide, ammonium hydroxide, and the like. The basic inorganic compound can be used in aqueous solution to perform a neutralization reaction of HCl by-product. If desired, the basic compound can be an organic base such as diethyl amine or tributyl amine or other amines. Typically, the un-neutralized copolymer crumb is contacted with the aqueous base by washing, which converts acidic byproduct to a salt (generally a sodium chloride salt if sodium hydroxide is the base and HCl is the acidic byproduct) and also removes some of the polymerization solvent. If desired, the un-neutralized copolymer crumb can be optionally first washed one or more times with water prior to contacting with the basic inorganic compound to remove excess polymerization solvent. Once the acidic byproduct in the copolymer crumb is neutralized, additional water washes can be employed to remove salt and polymerization solvent and lower the pH of the crumb, if needed.

The copolymer typically has an inherent viscosity of at least 3 dl/g, preferably at least 5 dl/g or higher. In some embodiments, the inherent viscosity can be 6 dl/g or greater.

The copolymer is preferably spun into fiber using solution spinning. Generally this involves solutioning the copolymer crumb in a suitable solvent to form a spin solution (also known as spin dope), the preferred solvent being sulfuric acid. The inventors have found that the use of copolymer crumb that has been neutralized as described herein dramatically reduces the formation of bubbles in the spin dope when such neutralized crumb is combined with sulfuric acid in the solutioning process. If the copolymer crumb is not neutralized, hydrochloric acid by-product in the copolymer can volatize on contact with the sulfuric acid and form bubbles in the spin dope. Since the solution viscosity of the spin dope is relatively high, bubbles that are formed during solutioning tend to stay in the spin dope and are spun into the filaments unless further steps are provided for their removal. The neutralized copolymer crumb, when solutioned in sulfuric acid, provides an essentially bubble-free and therefore more uniform spinning solution which is believed to provide more uniformly superior copolymer filaments and fibers.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air and is a preferred method for forming filaments It is believed that in addition to producing the spinning dope with neutralized copolymer crumb, for the best fiber properties, the manufacturing process of spinning fibers from an acid solvent should additionally include steps that extract acid solvent from the filaments. It is believed that failure to do this can result in more potential degradation of the copolymer in the fiber and subsequent decrease in fiber mechanical properties over time.

What the inventors have found is that traditional methods of neutralizing acid-containing as-spun fibers impacts the final tenacity that can be achieved by that fiber. Generally, prior art methods have been to neutralize the fiber with a simple strong base, most typically NaOH.

Figure 1:
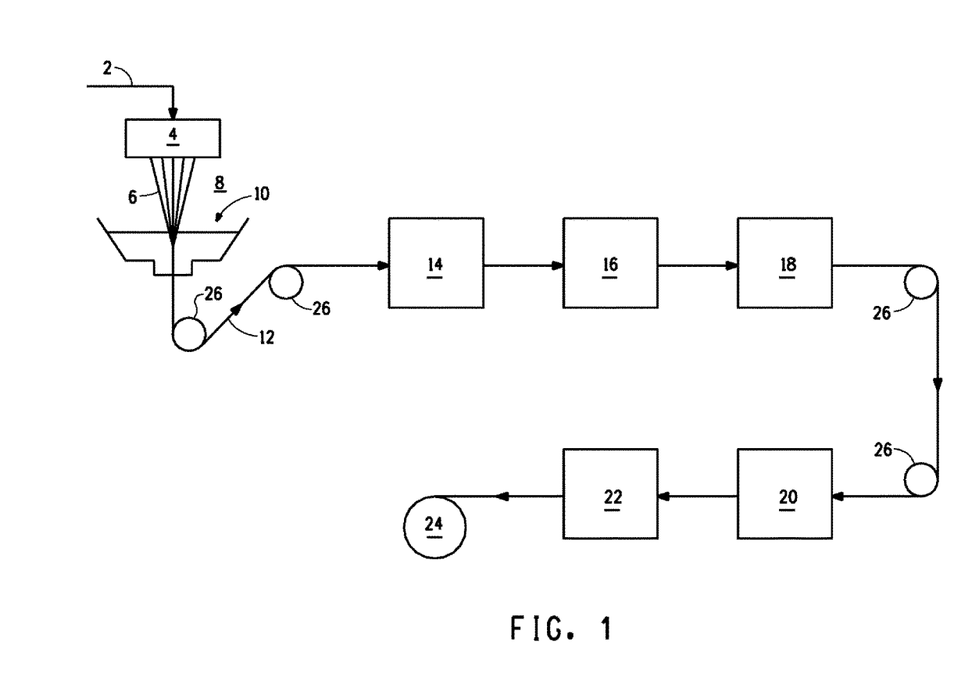
FIG. 1 is a schematic diagram of a fiber production process.

One process for making copolymer filaments or yarns is shown in FIG. 1. The dope solution 2, comprising copolymer and sulfuric acid, typically contains a high enough concentration of polymer for the polymer to form an acceptable filament 6 after extrusion and 12 after coagulation. When the polymer is lyotropic liquid-crystalline, the concentration of polymer in the dope 2 is preferably high enough to provide a liquid-crystalline dope. The concentration of the polymer is preferably at least about 12 weight percent, more preferably at least about 16 weight percent and most preferably at least about 20 weight percent. The concentration of the polymer is preferably less than about 30 weight percent, more preferably less than about 28 weight percent.

The polymer dope solution 2 may contain additives such as anti-oxidants, lubricants, ultra-violet screening agents, colorants and the like which are commonly incorporated. The spin dope solvent may contain co-solvents, but is principally sulfuric acid. In some embodiments the sulfuric acid is concentrated sulfuric acid and in some preferred embodiments, the sulfuric acid has a concentration of 99 to 101 percent. In some embodiments, the sulfuric acid has a concentration of greater than 100 percent.

The polymer dope solution 2 is typically extruded or spun through a die or spinneret 4 to prepare or form the dope filaments 6. The spinneret 4 preferably contains a plurality of holes. The number of holes in the spinneret and their arrangement is not critical, but it is desirable to maximize the number of holes for economic reasons. The spinneret 4 can contain as many as 100 or 1000, or more, and they may be arranged in circles, grids, or in any other desired arrangement. The spinneret 4 may be constructed out of any materials that will not be severely degraded by the dope solution 2.

The spinning process of FIG. 1 employs "air-gap" spinning (also sometimes known as "dry-jet" wet spinning). Dope solution 2 exits the spinneret 4 and enters a gap 8 (typically called an "air gap" although it need not contain air) between the spinneret 4 and a coagulation bath 10 for a very short duration of time. The gap 8 may contain any fluid that does not induce coagulation or react adversely with the dope, such as air, nitrogen, argon, helium, or carbon dioxide. The dope filament 6 proceeds across the air gap 8, and is immediately introduced into a liquid coagulation bath. Alternately, the fiber may be "wet-spun" (not shown). In wet spinning, the spinneret typically extrudes the fiber directly into the liquid of a coagulation bath and normally the spinneret is immersed or positioned beneath the surface of the coagulation bath. Either spinning process may be used to provide fibers for use in the processes of the invention. In some embodiments of the present invention, air-gap spinning is preferred.

The filament 6 is "coagulated" in the coagulation bath 10. In some embodiments the coagulation bath contains water or a mixture of water and sulfuric acid. If multiple filaments are extruded simultaneously, they may be combined into a multifilament yarn before, during or after the coagulation step. The term "coagulation" as used herein does not necessarily imply that the dope filament 6 is a flowing liquid and changes into a solid phase. The dope filament 6 can be at a temperature low enough so that it is essentially non-flowing before entering the coagulation bath 10. However, the coagulation bath 10 does ensure or complete the coagulation of the filament, i.e., the conversion of the polymer from a dope solution 2 to a substantially solid polymer filament 12. The amount of solvent, i.e., sulfuric acid, removed during the coagulation step will depend on variables such as the residence time of the filament 6 in the coagulation bath, the temperature of the bath 10, and the concentration of solvent therein.

After the coagulation bath, the fiber 12 may be contacted with one or more washing baths or cabinets 14. Washes may be accomplished by immersing the fiber into a bath, by spraying the fiber with the aqueous solution, or by other suitable means. Washing cabinets typically comprise an enclosed cabinet containing one or more rolls which the yarn travels across a number of times prior to exiting the cabinet.

The temperature of the washing fluid(s) is adjusted to provide a balance of washing efficiency and practicality and is greater than about 0° C. and preferably less than about 70° C. The washing fluid may also be applied in vapor form (steam), but is more conveniently used in liquid form. Preferably, a number of washing baths or cabinets, such as 16 and/or 18, are used. In a continuous process, the duration of the entire washing process in the preferred multiple washing bath(s) and/or cabinet(s) is preferably no greater than about 10 minutes. In some embodiments the duration of the entire washing process is 5 seconds or more; in some embodiments the entire washing is accomplished in 400 seconds or less. In a batch process, the duration of the entire washing process may be on the order of hours, as much as 12 to 24 hours or more.

The inventors have found that a majority of the sulfuric acid solvent is rapidly washed from the fiber while a portion of the solvent is removed much more slowly. While not being bound by any specific theory it is believed that as a result of the acidic environment, a portion of the sulfuric acid may exist as sulfate anions associated with protonated imidazole moieties, and is more slowly removed during water washing. The inventors have found that certain wash solutions remove sulfuric acid faster than solely water washing. Additionally, the inventors have found that certain washing fluids are detrimental to the development of tensile properties. Specifically washing with strong bases (those that fully dissociate in aqueous solution) such as NaOH as practiced in the art is advantageous to the rapid removal of residual acid solvent, however the inventors have found that application of strong bases such as NaOH for final washing or neutralization prior to any final rinsing as practiced in the art is detrimental to the development of tensile properties.

In some embodiments, the as-spun multi-filament yarn is washed with an aqueous base having a pKa less than or equal to 11 to release at least a portion of the sulfur. In some methods, the aqueous base comprises ammonium hydroxide, sodium bicarbonate, sodium carbonate, or mixtures thereof.

In some embodiments, the fiber may be additionally washed or rinsed with water.

The fiber or yarn 12, after washing, may be dried in a dryer 20 to remove water and other fluids. One or more dryers may be used. In certain embodiments, the dryer may be an oven which uses heated air to dry the fibers. In other embodiments, heated rolls may be used to heat the fibers. The fiber is heated in the dryer to a temperature of at least about 20° C. but less than about 200° C., more preferably less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. The inventors have discovered that low temperature drying is a preferred route to improved fiber strength. Specifically, the inventors have found that the best fiber strength properties are achieved when the first drying step (i.e. heated roll, heated atmosphere as in an oven, etc.) experienced by the never-dried yarn is conducted at gentle temperatures not normally used in continuous processes used to dry high strength fibers on commercial scale. It is believed that the copolymer fiber has more affinity to water than PPD-T homopolymer; this affinity slows the diffusion rate of water out of the polymer during drying and consequently if the never-dried yarn is directly exposed to typical high drying temperatures, generally used to create a large thermal driving force and reduce drying time, irreparable damage to the fiber occurs resulting in lower fiber strength. In some embodiments, the fiber is heated at least to about 30° C.; in some embodiments the fiber is heated at least to about 40° C.

The dryer residence time is less than ten minutes and is preferably less than 180 seconds. The dryer can be provided with a nitrogen or other non-reactive atmosphere. The drying step typically is performed at atmospheric pressure. If desired, however, the step may be performed under reduced pressure. In one embodiment, the filaments are dried under a tension of at least 0.1 gpd, preferably a tension of 2 gpd or greater.

Following the drying step, the fiber is preferably further heated to a temperature of at least 350° C. in, for instance, a heat setting device 22. One or more devices may be utilized. For example, such processing may be done in a nitrogen purged tube furnace 22 for increasing tenacity and/or relieving the mechanical strain of the molecules in the filaments. In some embodiments, the fiber or yarn is heated to a temperature of at least 400° C. In some embodiments, after heating to at least 350° C., the yarns have a tenacity of 32 cN/dtex (35.6 gpd) or higher, preferably 34 cN/dtex (37.8 gpd) or higher. It is especially preferred that the yarns have a tenacity of 36 cN/dtex (40 gpd) or higher.

In one embodiment, the filaments are heated under a tension of 1 gpd or less.

In some embodiments, the heating is a multistep process. For example, in a first step the fiber or yarn may be heated at a temperature of 200 to 360° C. at a tension of at least 0.2 cN/dtex, followed by a second heating step where the fiber or yarn is heated at a temperature of 370 to 500° C. at a tension of less than 1 cN/dtex.

Finally, the yarn 12 is wound up into a package on a windup device 24. Rolls, pins, guides, and/or motorized devices 26 are suitably positioned to transport the filament or yarn through the process. Such devices are well known in the art and any suitable device may be utilized.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression

$$V_{inh}=\ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g").

The invention is further directed, in part, to fabrics that include filaments or yarns of the present invention, and articles that include fabrics of the present invention. For purposes herein, "fabric" means any woven, knitted, or non-woven structure. By "woven" is meant any fabric weave, such as, plain weave, crowfoot weave, basket weave, satin weave, twill weave, and the like. By "knitted" is meant a structure produced by interlooping or intermeshing one or more ends, fibers or multifilament yarns. By "non-woven" is meant a network of fibers, including unidirectional fibers (optionally contained within a matrix resin), felt, and the like.

Definitions

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine refers to a copolymer having one or more units of the formula:

Similarly, a copolymer comprising residues of DAPBI contains one or more units of the structure:

A copolymer having residues of terephthaloyl dichloride contains one or more units of the formula:

The term "polymer," as used herein, means a polymeric compound prepared by polymerizing monomers, end-functionalized oligomers, and/or end-functionalized polymers whether of the same or different types. The term "copolymer" (which refers to polymers prepared from at least two different monomers), the term "terpolymer" (which refers to polymers prepared from three different types of monomers), and the term "quadpolymer (which refers to polymers having four different types of monomers) are included in the definition of polymer. In some embodiments, all monomers can be reacted at once to form the polymer. In some embodiments, monomers can be reacted sequentially to form oligomers which can be further reacted with one or more monomers to form polymers.

By "oligomer," it is meant polymers or species eluting out at <3000 MW with a column calibrated using polyparaphenylene diamine terephthalamide homopolymer.

As used herein, "stoichiometric amount" means the amount of a component theoretically needed to react with all of the reactive groups of a second component. For example, "stoichiometric amount" refers to the moles of terephthaloyl dichloride needed to react with substantially all of the amine groups of the amine component (paraphenylene diamine and DAPBI). It is understood by those skilled in the art that the term "stoichiometric amount" refers to a range of amounts that are typically within 10% of the theoretical amount. For example, the stoichiometric amount of terephthaloyl dichloride used in a polymerization reaction can be 90-110% of the amount of terephthaloyl dichloride theoretically needed to react with all of the paraphenylene diamine and DAPBI amine groups.

"Fiber" means a relatively flexible, unit of matter having a high ratio of length to width across its cross-sectional area perpendicular to its length. Herein, the term "fiber" is used interchangeably with the term "filament". The cross section of the filaments described herein can be any shape, but are typically solid circular (round) or bean shaped. Fiber spun onto a bobbin in a package is referred to as continuous fiber. Fiber can be cut into short lengths called staple fiber. Fiber can be cut into even smaller lengths called floc. The fibers of the invention are generally solid with minimal voids. The term "yarn" as used herein includes bundles of filaments, also known as multifilament yarns; or tows comprising a plurality of fibers; or spun staple yarns. Yarn may optionally be intertwined and/or twisted.

The term "organic solvent" is understood herein to include a single component organic solvent or a mixture of two or more organic solvents. In some embodiments, the organic solvent is dimethylformamide, dimethylacetamide (DMAC), N-methyl-2-pyrrolidone (NMP), or dimethylsulfoxide. In some preferred embodiments, the organic solvent is N-methyl-2-pyrrolidone or dimethylacetamide.

The term "inorganic salt" refers to a single inorganic salt or to a mixture of two or more inorganic salts. In some embodiments, the inorganic salt is sufficiently soluble in the solvent and liberates an ion of a halogen atom. In some embodiments, the preferred inorganic salt is KCl, $ZnCl_2$, LiCl or $CaCl_2$. In certain preferred embodiments, the inorganic salt is LiCl or $CaCl_2$.

By "never-dried" it is meant the moisture content of the fiber made from these polymers has never been lower than at least about 25 weight percent of the fiber.

By "solids" it is meant the ratio of the mass of copolymer (neutral basis) to the total mass of the solution, this is, the mass of copolymer plus solvent.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

Test Methods

Yarn tenacity is determined according to ASTM D 885 and is the maximum or breaking stress of a fiber as expressed as either force per unit cross-sectional area, as in giga-Pascals (GPa), or in force per unit mass per length, as in grams per denier or grams per dtex.

Inherent viscosity is determined using a solution in which a polymer is dissolved in concentrated sulfuric acid with a concentration of 96 wt % at a polymer concentration (C) of 0.5 g/dl and at a temperature of 25° C. Inherent viscosity is then calculated as ln $(t_{poly}/t_{solv})/C$ where $t_{poly}$ is the drop time for the polymer solution and $t_{solv}$ is the drop time of the pure solvent.

Percent sulfur determined by combustion is measured according to ASTM D4239 Method B. A carefully weighed amount of sample (typically 2.5-4.5 mg) and of vanadium pentoxide accelerant (typically 10 mg) is placed in a tin capsule. The capsule is then dropped into an oxidation/reduction reactor kept at a temperature of 900-1000° C. The exact amount of oxygen required for optimum combustion of the sample is delivered into the combustion reactor at a precise time. The exothermic reaction with oxygen raises the temperature to 1800° C. for a few seconds. At this high temperature both organic and inorganic substances are converted into elemental gases which, after further reduction (to nitrogen, carbon dioxide, water and sulfur dioxide), are separated in a chromatographic column and finally detected by a highly sensitive thermal conductivity detector (TCD). Typical Running Conditions for Carbon, Hydrogen, Nitrogen, and Sulfur (CHNS):

| Method setpoints | CHNS |
|---|---|
| Left Furnace (° C.) | 950 |
| Oven (° C.) | 75 |
| Carrier (ml/min) | 140 |
| Oxygen (ml/min) | 250 |
| Reference (ml/min) | 150 |
| Cycle (Run Time) (sec) | 480 |
| Sampling Delay (sec) | 12 |
| Oxygen Injection End (sec) | 5 |

Four samples of BBOT ((5-tert-butyl-benzoxazol-2yl) thiophene. C=72.53% H=6.09% N=6.51% S=7.44%) standard for sulfur are run to develop the calibration curve. Once the calibration curve is verified, samples are analyzed.

The operation of a High Temperature Tube Furnace is described in ASTM D4239-10: "Sulfur in the Analysis Sample of Coal and Coke Using High Temperature Tube Furnace Combustion."

For better precision of sulfur content below 0.05 weight percent, it is desirable to use the following technique. A clean 100-mL Quartz crucible is placed on a 4 decimal place analytical balance and the balance is zeroed. Between 0.3 g-0.6 g of fiber or polymer resin is weighed into the crucible. Small amounts of 0.1 N sodium hydroxide are carefully added to the fiber or polymer resin sample until it is barely covered with the solution. The sample is allowed to set in the solution for 15 minutes. The fiber or polymer resin is heated on a hotplate at a temperature of 190 deg C. The solution is allowed to slowly evaporate. This step usually takes about 30 minutes. After the solution has completely evaporated in the 100-mL crucible, the crucible is placed in a muffle furnace set at a temperature of 600 deg C. The sample is allowed to ash for 5 hours. After the 5 hour ashing time, the crucible is removed from the muffle furnace and allowed to cool for 30 minutes. 2 mL of concentrated environmental grade nitric acid is added to the 25-mL graduated cylinder and the cylinder is then filled to the 25 mL mark with Milli-Q Water. The acid solution is transferred from the 25-mL graduated cylinder to the 100-mL crucible containing the ashed material. As soon as the acid solution is added, the ash immediately dissolves. The acid solution is transferred from the 100-mL crucible to a 15-mL plastic centrifuge tube. The acid solution is then analyzed in the axial mode by a Perkin Elmer 5400 DV ICP Emission Spectrometer using the 181.975 nm Sulfur Emission line. The ICP Emission Spectrometer is calibrated using a blank, a 10 ppm Sulfur Standard, and a 100 ppm Sulfur standard. The ICP standards were prepared by High Purity Standards located in Charleston, S.C.

Figure 3:
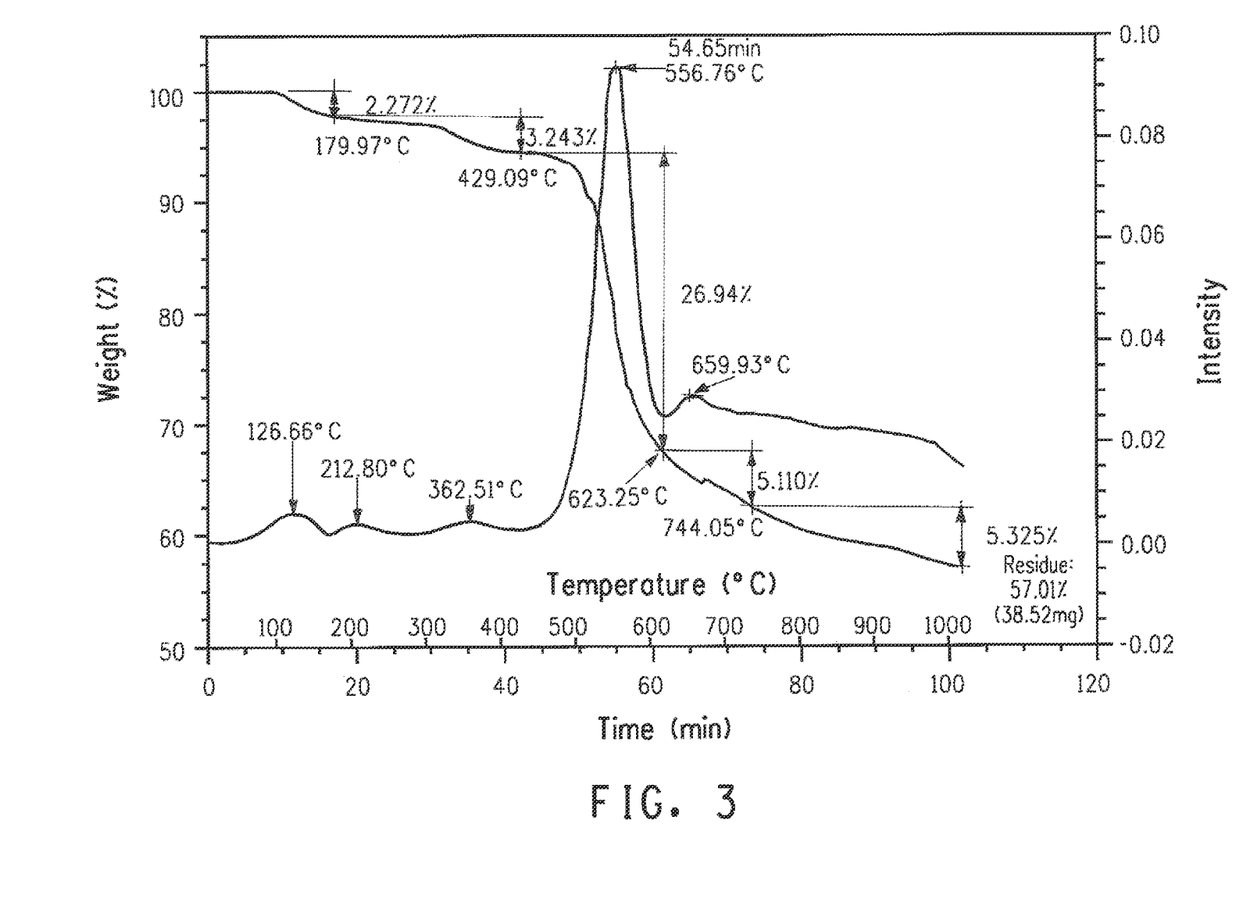
FIG. 3 presents TGA-IR weight loss results from aramid copolymer sample that contains chloride anions with no chlorinated monomer.
Figure 4:
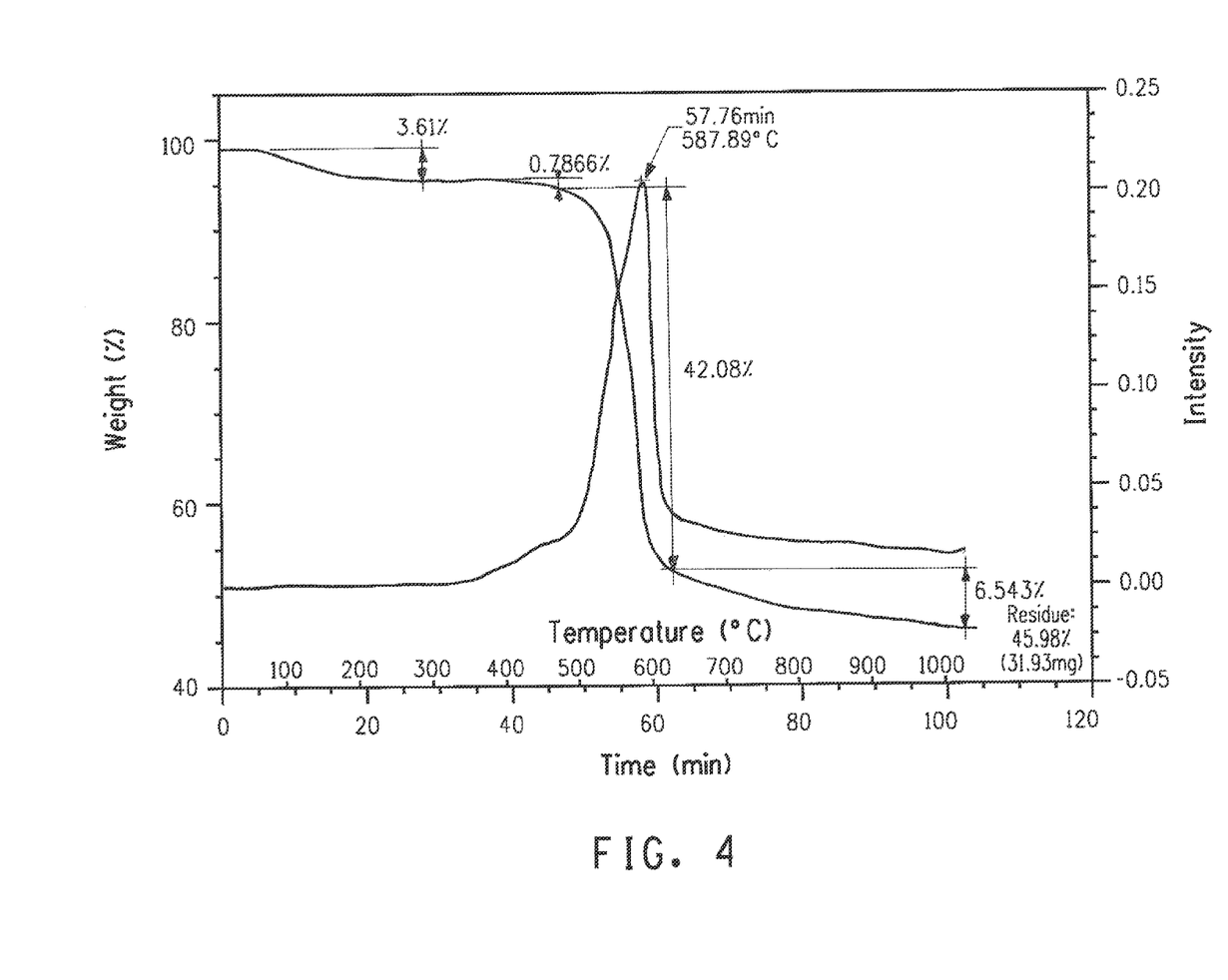
FIG. 4 presents TGA-IR weight loss results from aramid copolymer sample that contains chlorinated monomer with no chloride anions.

Percent halogen in the fiber can be determined via XRF, or CIC, or other suitable methods known to those skilled in the art. To distinguish between ionic forms of halogens remaining in the fiber from halogen substituents on monomer residues further techniques are useful. For example, TGA-IR (ASTM E2105-00) may be used to distinguish ionic halogens released at lower temperatures from halogen substituents on monomer residues that are released during degradation at higher temperatures. For example, FIGS. 2, 3, and 4 illustrate the use of TGA-IR as a means of differentiating chloride anions from covalently bonded chlorine.

Figure 2:
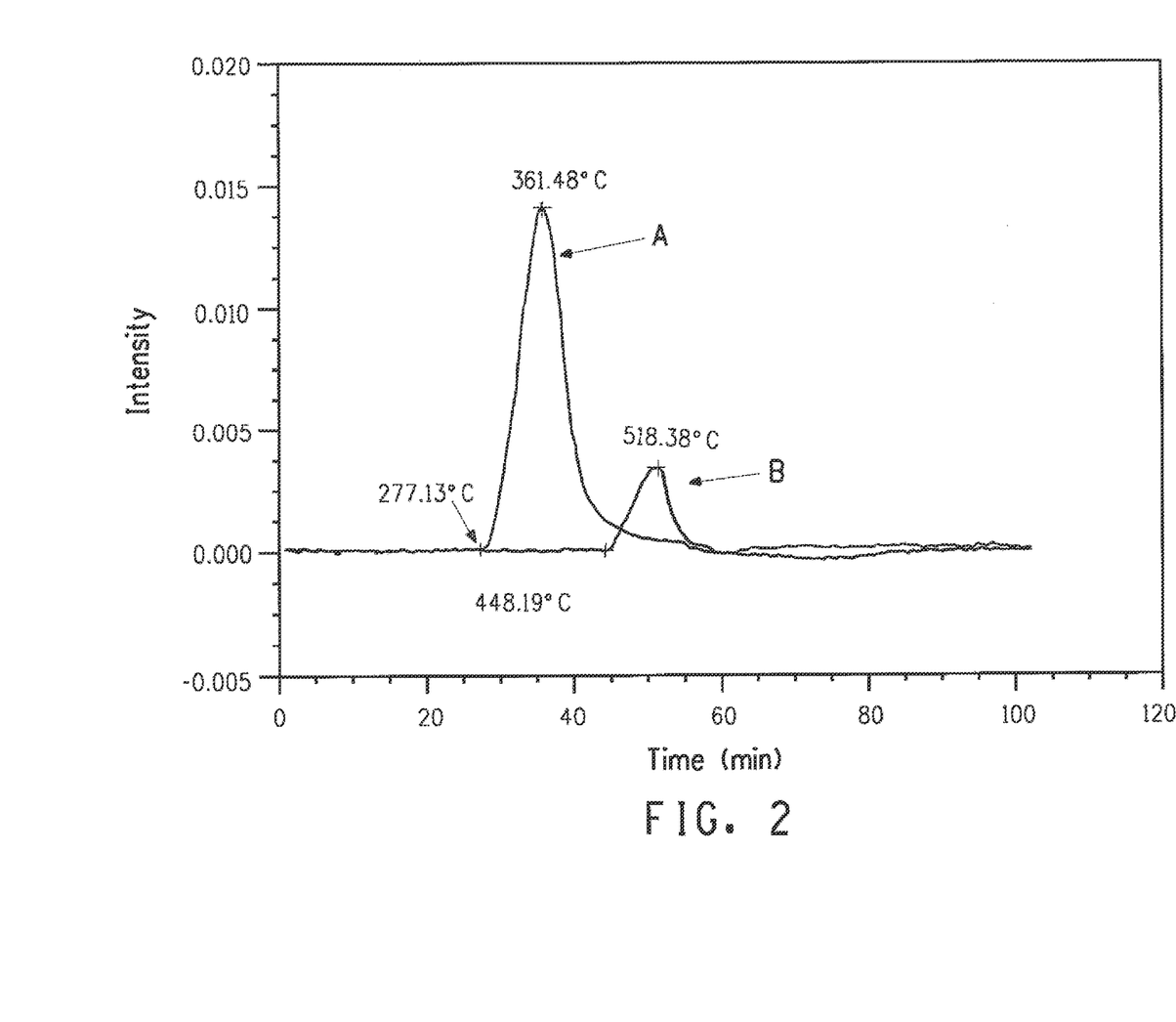
FIG. 2 presents TGA-IR identification of HCl evolution results for:
A. Aramid copolymer sample that contains chloride anions with no chlorinated monomer.
B. Aramid copolymer sample that contains chlorinated monomer with no chloride anions.

FIG. 2 compares HCl evolution profiles (Chemigrams) identified via monitoring of the appropriate IR spectral region during heating of a sample (A) containing ionic chlorides versus a sample (B) containing a chlorine ring substituent. FIGS. 3 and 4 illustrate the corresponding weight loss provided by TGA.

Moisture content of the fiber was obtained by first weighing the fiber sample, placing the sample in an oven at 300° C. for 20 minutes, then immediately re-weighing the sample. Moisture content is then calculated by subtracting the dried sample weight from the initial sample weight and dividing by the dried sample weight times 100%.

Many of the following examples are given to illustrate various embodiments of the invention and should not be interpreted as limiting it in any way. All parts and percentages are by weight unless otherwise indicated.

EXAMPLES

Polymer Example 1

N-methyl-2-pyrrolidone (NMP) solvent containing calcium chloride (CaCl2) in amounts appropriate for the final solution concentration was charged in a FM130D Littleford Reactor. Appropriate amounts of the monomer 5(6)-amino-2-(p-aminophenyl)benzimidazole (DAPBI) and terephthaloyl dichloride (TCL) were then added to the reactor and reacted to form oligomers. To this mixture, appropriate amounts of para-phenylenediamine (PPD) and TCL were added to form a finished copolymer crumb. The crumb was ground into smaller particles and then first washed with a sodium hydroxide solution to neutralize reaction byproducts and then with water to remove NMP. The polymer was then recovered, dried, and its inherent viscosity determined as summarized in Table 1.

TABLE 1

| Item | DAPBI/PPD molar ratio | Inherent Viscosity (dl/g) |
|---|---|---|
| P1-1 | 50/50 | 6.10 |
| P1-2 | 60/40 | 6.13 |
| P1-3 | 70/30 | 5.90 |

Polymer Example 2

N-methyl-2-pyrrolidone (NMP) solvent containing calcium chloride (CaCl2) in amounts appropriate for the final solution concentration was charged in a FM130D Littleford Reactor. Appropriate amounts of the monomer 5(6)-amino-2-(p-aminophenyl)benzimidazole (DAPBI), PPD and a portion of terephthaloyl dichloride (TCL) were then added to the reactor and reacted to form oligomers. To this mixture, appropriate amounts of TCL were added to form a finished copolymer crumb. The crumb was ground into smaller particles and then first washed with a sodium hydroxide solution to neutralize reaction byproducts and then with water to remove NMP. The polymer was then recovered, dried, and its inherent viscosity determined as summarized in Table 2.

TABLE 2

| Item | DAPBI/PPD molar ratio | Inherent Viscosity (dl/g) |
|---|---|---|
| P2-1 | 40/60 | 7.00 |
| P2-2 | 50/50 | 6.39 |
| P2-3 | 75/25 | 3.98 |

Comparative Example A

A polymer solution having a concentration of 22.2 wt % solids was formed using a copolymer having a 70/30 DAPBI/PPD molar ratio. The copolymer solution was spun through a spinneret having 270 holes, to produce nominal linear density of about 3.0 denier per filament. Yarn was coagulated and water washed to 7.1 weight percent sulfur A sample of this yarn in the form of a loose skein (appox. 1.4 gram samples) was washed in 1 liter baths of fresh water at 20° C. using a wash time of 60 seconds per bath. Excess fluid was blotted off the fiber sample with a clean dry paper towel after each 60 second wash. For this sample seven consecutive fresh water washes were used. A residual sulfur level of 2.37 wt % was determined by combustion analysis.

Example 1

A polymer solution having a concentration of 22.2 wt % solids was formed using a copolymer having a 70/30 DAPBI/PPD molar ratio. The copolymer solution was spun through a spinneret having 270 holes, to produce a nominal linear density of about 1.5 denier per filament. Yarn was coagulated and water washed to 2.71 weight percent sulfur. Wet-never-dried samples in the form of loose skeins of the yarn (appox. 1.4 gram samples) were then washed for 30 seconds in one liter of fresh water. Excess fluid was blotted off the fiber sample with a clean dry paper towel and the sample was then washed in 1 liter baths of aqueous ammonium hydroxide for 30 seconds at 20 C as shown in Table 3. Excess fluid was blotted off the fiber sample with a clean dry paper towel and the sample was then washed for 5 minutes in one liter of fresh water. Residual sulfur in the yarns determined by combustion is shown in Table 3.

TABLE 3

| Item | NH4OH Concentration (wt %) | Residual Sulfur (wt %) |
|---|---|---|
| 1-1 | 0.5 | 0.15 |
| 1-2 | 2.0 | 0.11 |

Example 2 and Comparative Example B

A polymer solution in concentrated sulfuric acid having a concentration of 22 wt % solids was formed using a neutralized copolymer made from TCl and a 70/30 DAPBI/PPD diamine molar ratio having an inherent viscosity of 5.33. The copolymer solution was spun through a spinneret having 270 holes, to produce a nominal linear density of 1.75 denier per filament. Yarn was coagulated and water washed to a sulfur level of 3.0 wt %.

Never-dried samples for further washing were prepared by non-overlapped winding of approximately 100 m lengths onto perforated plastic cores. Wash experiments were performed at room temperature in a sequence of three separate but consecutive soaking baths. Bath 1 employed the aqueous wash solutions indicated in Table 4. Baths 2 and 3 were fresh water washing baths for each sample. Washing time was 30 minutes in each of the consecutive baths.

After washing, samples were air dried overnight, then further dried in an oven at 50° C. for 4 hours. Samples were then heat treated to 415° C. under a tension of 0.5 g/denier. Residual sulfur measured by combustion and heat treated tenacities are summarized in Table 4. Yarn inherent viscosity was determined to be 3.7 dl/g.

TABLE 4

| Item | Bath 1 Solute | Bath 1 Concentration (wt %) | Residual S (wt % S) | HT Tenacity (gpd) |
|---|---|---|---|---|
| 2-1 | NH₄OH | 0.25 | 0.21 | 27.2 |
| 2-2 | NH₄OH | 0.5 | 0.16 | 27.7 |
| 2-3 | NH₄OH | 1.0 | 0.17 | 27.3 |
| C-B1 | Water | 0 | 2.35 | 23.0 |

Example 3 and Comparative Example C

Example 2 was repeated, however in this example the wet-never dried yarn had been spun with a nominal linear density of about 1.50 denier per filament and was water washed to a sulfur level of 2.83 weight percent.

Never-dried samples for further washing were prepared by non-overlapped winding of approximately 100 m lengths onto perforated plastic cores. Wash experiments were performed at room temperature in a sequence of three separate but consecutive soaking baths. Bath 1 employed the aqueous wash solutions indicated in Table 5. Baths 2 and 3 were fresh water washing baths for each sample. Washing time was 30 minutes in each of the consecutive baths.

After washing, samples were air dried overnight, then further dried in an oven at 50° C. for 4 hours. Samples were then heat treated to 400° C. under a tension of 0.5 g/denier. Residual sulfur measured by combustion and heat treated tenacities are summarized in Table 5.

TABLE 5

| Item | Bath 1 Solute | Bath 1 Concentration (wt %) | Residual S (wt %) | HT Tenacity (gpd) |
|---|---|---|---|---|
| C-C1 | NaOH | 1 | 0.00 | 24.6 |
| 3-1 | NaHCO₃ | 2 | 0.32 | 29.2 |
| 3-2 | Na₂CO₃ | 2 | 0.52 | 28.8 |
| 3-3 | NH₄OH | 2 | 0.00 | 29.5 |

Example 4

A polymer solution having a concentration of 22 wt % solids was formed using a copolymer having a 70/30 DAPBI/PPD molar ratio. The copolymer solution was spun through a spinneret having 270 holes, to produce nominal linear density of 1.75 denier per filament.

The yarn was continuously washed in 9 wash cabinets. The first wash cabinet had 10 advancing wraps through wash sprays and applicators and the remaining 8 wash cabinets had 20 advancing wraps through wash sprays and applicators. For this example the second wash module was chosen for washing with aqueous ammonium hydroxide at concentrations listed in Table 6 while all other modules employed water washing. Residence time in a single wash module for this example was 120 seconds. All wash modules were operated at 20° C. Table 6 summarizes the residual sulfur in the yarns as determined by combustion along with the tenacities of the samples after heat treating to 400° C. under a tension of 0.5 g/denier. When the second wash cabinet was operated with water the residual sulfur content of the yarn as measured by combustion was 2.33 wt %.

TABLE 6

| Item | NH₄OH Wash Concentration (wt %) | Residual Sulfur (wt %) | Yarn Tenacity After Heat Treatment (gpd) |
|---|---|---|---|
| 4-1 | 0.25 | 0.50 | 28.9 |
| 4-2 | 0.5 | 0.35 | 28.4 |
| 4-3 | 1.0 | 0.36 | 26.8 |
| 4-4 | 1.5 | 0.28 | 28.1 |
| 4-5 | 2.0 | 0.27 | 27.6 |

Example 5 and Comparative Example D

A polymer solution in concentrated sulfuric acid having a concentration of 22 wt % solids was formed using a neutralized copolymer made from TCl and a 70/30 DAPBI/PPD diamine molar ratio having an inherent viscosity of 5.2. The copolymer solution was spun through a spinneret having 270 holes, to a produce nominal linear density of 1.5 denier per filament. Yarn was coagulated and water washed to 2.83 weight percent sulfur.

Never-dried samples for further washing were prepared by non-overlapped winding of approximately 100 m lengths onto perforated plastic cores. Wash experiments were performed at room temperature in a sequence of four separate but consecutive soaking baths. Baths 1, 3, and 4 were fresh water washing baths for each sample. Bath 2 employed the 2 wt % wash solutions indicated in Table 7. Washing time was 30 minutes in each of the consecutive baths.

After washing, each sample was dried to 200° C. under a tension of 1.5 g/denier. Samples were then heat treated to 440° C. under a tension of 0.5 g/denier. Residual sulfur measured by combustion and heat treated tenacities are summarized in Table 7.

TABLE 7

| Item | 2 wt % Wash Solution Bath 2 | HT Tenacity (gpd) | Residual S (wt %) |
|---|---|---|---|
| 5-1 | NH4OH | 31.7 | 0.00 |
| 5-2 | NaHCO3 | 33.0 | 0.06 |
| C-D1 | NaOH | 27.4 | 0.02 |
| C-D2 | KOH | 26.6 | 0.00 |
| C-D3 | LiOH | 28.7 | 0.04 |
| C-D4 | Water | 30.1 | 2.20 |

What is claimed:

1. A process for producing a yarn comprising the steps of:
   (a) producing a plurality of dope filaments by spinning a polymer solution through a multi-hole spinneret, the polymer solution being formed from sulfuric acid and a polymer in the form of a neutralized polymer crumb, said polymer comprising residues of 5(6)-amino-2-(p-aminophenyl)benzimidazole, terephthaloyl dichloride, and para-phenylenediamine;
   (b) coagulating the plurality of dope filaments into an as-spun yarn;
   (c) contacting the yarn with an aqueous base having a pKa less than or equal to 11;
   (d) rinsing the yarn; and
   (e) heating the yarn to a temperature of at least 350° C.

2. The process of claim 1, wherein in step c) the yarn is contacted with aqueous base comprising ammonium hydroxide, sodium bicarbonate, sodium carbonate, or mixtures thereof.

3. The process of claim 1, wherein said polymer comprises copolymer derived from the copolymerization of para-phenylenediamine, 5(6)-amino-2-(p-aminophenyl)benzimidazole; and terephthaloyl dichloride wherein the molar ratio of 5(6)-amino-2-(p-aminophenyl)benzimidazole to aromatic diamine is 30/70 to 85/15.

4. The process of claim 3 wherein the molar ratio of 5(6)-amino-2-(p-aminophenyl)benzimidazole to aromatic diamine is 45/55 to 85/15.

5. The process of claim 1, wherein in step d) the yarn is rinsed with additional quantities of aqueous base, said base being the same or different than the base used in step c).

6. The process of claim 1, wherein in step d) the yarn is rinsed with an aqueous solution.

7. The process of claim 1, wherein in step d) the yarn is rinsed with water.

8. The method of claim 1, where after step b), the yarn has a sulfur content of 0.01 to 3 percent, based on the weight of the yarn.

9. The method of claim 8, where after step b), the yarn has a sulfur content of 0.1 to 2.5 percent, based on the weight of the yarn.

10. The method of claim 8, where after step b), the yarn has a sulfur content of 0.05 to 1.75 percent, based on the weight of the yarn.

11. The method of claim 10, where after step b), the yarn has a sulfur content of 0.05 to 1.0 percent, based on the weight of the yarn.

12. The method of claim 8, where after step b), the yarn has a sulfur content of 0.01 to 0.08 percent, based on the weight of the yarn.

13. The method of claim 12, where after step b), the yarn has a sulfur content of 0.01 to 0.05 percent, based on the weight of the yarn.

14. The process of claim 1, wherein the yarn, after heating, has a tenacity of 32 cN/dtex (35.6 gpd) or higher.

15. The process of claim 14, wherein the yarn, after heating, has a tenacity of 34 cN/dtex (37.8 gpd) or higher.

16. The process of claim 15, wherein the yarn, after heating, has a tenacity of 36 cN/dtex (40 gpd) or higher.

* * * * *